US007532295B2

(12) United States Patent
Murade

(10) Patent No.: US 7,532,295 B2
(45) Date of Patent: May 12, 2009

(54) ELECTRO-OPTICAL DEVICE AND ELECTRONIC APPARATUS INCLUDING THE SAME

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 304 days.

(21) Appl. No.: 11/507,397

(22) Filed: Aug. 21, 2006

(65) Prior Publication Data

US 2007/0046844 A1 Mar. 1, 2007

(30) Foreign Application Priority Data

Aug. 24, 2005 (JP) ............................. 2005-242595
Jun. 21, 2006 (JP) ............................. 2006-171358

(51) Int. Cl.
G02F 1/1345 (2006.01)
G09G 5/10 (2006.01)

(52) U.S. Cl. ...................... 349/151; 349/149; 345/690; 345/42

(58) Field of Classification Search ................. 349/151, 349/33, 34, 41, 56, 73, 74, 84, 108, 139, 349/141, 143, 145, 146, 149, 158, 190; 345/690, 345/698, 42, 90, 84, 99
See application file for complete search history.

(56) References Cited

U.S. PATENT DOCUMENTS

| 6,104,370 | A * | 8/2000 | Nakagaki et al. ............. 345/100 |
| 7,184,010 | B2 * | 2/2007 | Aoki et al. ..................... 345/99 |
| 7,221,344 | B2 * | 5/2007 | Shimomaki .................. 345/87 |
| 2003/0067429 | A1 * | 4/2003 | Aoki et al. ..................... 345/87 |
| 2004/0041776 | A1 * | 3/2004 | Yokokawa .................... 345/99 |
| 2004/0100608 | A1 | 5/2004 | Matsueda et al. ........... 349/149 |
| 2004/0257303 | A1 * | 12/2004 | Fujita .......................... 345/51 |
| 2005/0012706 | A1 | 1/2005 | Murade ....................... 345/99 |

FOREIGN PATENT DOCUMENTS

| CN | 1499273 A | 5/2004 | ............ 349/151 X |
| CN | 1573888 A | 2/2005 | ............ 349/151 X |
| EP | 1217422 A | 6/2002 | ............ 349/151 X |
| JP | 2001-228826 A | 8/2001 | ............ 349/151 X |
| JP | A-2004-139111 | 5/2004 | ............ 349/151 X |
| KR | 1994-0018683 A | 8/1994 | ............ 349/151 X |
| KR | 2002-0056893 A | 3/2002 | ............ 349/151 X |

\* cited by examiner

*Primary Examiner*—Brian M Healy
(74) *Attorney, Agent, or Firm*—AdvantEdge Law Group, LLC

(57) ABSTRACT

An electro-optical device includes a substrate, a plurality of pixel portions disposed in a pixel area, a plurality of scanning lines and a plurality of data lines disposed in the pixel area, at least one scanning line drive circuit that supplies scanning signals to the plurality of scanning lines, and at least one reverse-direction control signal generating circuit that generates, based on a forward-direction control signal for controlling the scanning line drive circuit to supply the scanning signals to the plurality of scanning lines in a first order, a reverse-direction control signal for controlling the scanning line drive circuit to supply the scanning signals to the plurality of scanning lines in a second order, which is the reverse of the first order, and that supplies the forward-direction control signal and the reverse-direction control signal to the scanning line drive circuit. The plurality of pixel portions, the plurality of scanning lines and the plurality of data lines, the scanning line drive circuit, and the reverse-direction control signal generating circuit being disposed on the substrate.

9 Claims, 6 Drawing Sheets

ELECTRO-OPTICAL DEVICE AND ELECTRONIC APPARATUS INCLUDING THE SAME

BACKGROUND

1. Technical Field

The present invention relates to an electro-optical device, such as a liquid crystal device, and an electronic apparatus, such as a liquid crystal projector, including the electro-optical device.

2. Related Art

When incorporating the above type of electro-optical device into, for example, a liquid crystal projector, because of the positional relationship of the elements of an optical system, it is sometimes necessary to invert images, and more specifically, to vertically invert images or to vertically and horizontally invert images. For example, in a multi-panel color projector including three liquid crystal devices as light valves, for example, red (R), green (G), and blue (B) light valves, white light is emitted from a light source and is separated into different colors of light components after passing through a half mirror, a mirror, a prism, etc., and then, the individual color components are modulated by the corresponding light valves and are again synthesized into one light component. During this process, some light components are reflected by the half mirror an even number of times, while the other light components are reflected by the half mirror an odd number of times. Accordingly, among the R, G, and B light valves, it is necessary for, for example, the G valve, to invert images of the G color. If Liquid crystal projectors, regardless of whether they are a single-panel type or a multi-panel type, can display, for example, vertically inverted images, such liquid crystal projectors can be used as a floor-installed type in which liquid crystal projectors are installed on the floor and as a ceiling-fixed type in which liquid crystal projectors are fixed on the ceiling upside down.

To perform such display inversion, a display device that can switch the scanning directions of scanning line drive circuits is disclosed in, for example, JP-A-2004-139111, by the same assignee as that of this application. According to the technique disclosed in that publication, bidirectional shift registers that can perform two-way operations are used for scanning line drive circuits, and by switching the scanning directions of the bidirectional shift registers, display can be switched between standard images and inverted images.

In the above-described related art, however, a control signal for reversing the scanning direction (hereinafter referred to as the "reverse-direction control signal") should be supplied from an external circuit, separately from a control signal for the standard scanning direction (hereinafter referred to as the "standard-direction control signal"). It is thus necessary to provide an external-circuit connecting terminal for the reverse-direction control signal and also to provide dedicated wiring extended from the external-circuit connecting terminal. Additionally, since a wiring path for supplying the reverse-direction control signal, for example, from the external-circuit connecting terminal to the scanning line drive circuits is long, the reverse-direction control signal may be influenced by noise from another circuit, causing differences in the phase, amplitude, waveform, etc., between the standard-direction control signal and the reverse-direction control signal.

SUMMARY

An advantage of the invention is that it provides an electro-optical device that can stably supply signals for controlling the scanning direction to scanning line drive circuits so that erroneous operations in the scanning line drive circuits can be prevented.

According to an aspect of the invention, there is provided an electro-optical device including a substrate, a plurality of pixel portions disposed in a pixel area, a plurality of scanning lines and a plurality of data lines disposed in the pixel area, at least one scanning line drive circuit that supplies scanning signals to the plurality of scanning lines, and at least one reverse-direction control signal generating circuit that generates, based on a forward-direction control signal for controlling the scanning line drive circuit to supply the scanning signals to the plurality of scanning lines in a first order, a reverse-direction control signal for controlling the scanning line drive circuit to supply the scanning signals to the plurality of scanning lines in a second order, which is the reverse of the first order, and that supplies the forward-direction control signal and the reverse-direction control signal to the scanning line drive circuit. The plurality of pixel portions, the plurality of scanning lines and the plurality of data lines, the scanning line drive circuit, and the reverse-direction control signal generating circuit are disposed on the substrate.

According to the aforementioned electro-optical device, in operation, a data line drive circuit supplies image signals to the pixel portions via the data lines, and also, the scanning line drive circuit sequentially selects the scanning lines, i.e., the scanning line drive circuit sequentially supplies scanning signals to the pixel portions via the scanning lines. Simultaneously with the supply of the scanning signals, the image signals are supplied to the pixel portions via the data lines, and then, an electro-optical material, such as a liquid crystal, held between the pixel electrodes and the counter electrodes, is driven by the individual pixel portions, thereby performing active matrix driving. That is, images are displayed in a pixel area or a pixel array area (or also referred to as an "image display area") in which the pixel portions are disposed.

The electro-optical apparatus includes the reverse-direction control signal generating circuit on the substrate. Based on the forward-direction control signal for controlling the scanning line drive circuit to supply the scanning signals to the plurality of scanning lines in the first order, the reverse-direction control signal generating circuit generates the reverse-direction control signal for controlling the scanning line drive circuit to supply the scanning signals to the plurality of scanning lines in the second order, which is the reverse of the first order. The forward-direction control signal is supplied from, for example, an external circuit, via the external-circuit connecting terminal. The forward-direction control signal is a signal for controlling the scanning line drive circuit to supply the scanning signals in the first order, for example, in the order from the top to the bottom in the pixel area, while the reverse-direction control signal is a signal for controlling the scanning line drive circuit to supply the scanning signals in the second order, for example, in the order from the bottom to the top in the pixel area. That is, the image formed when the scanning line drive circuit is driven on the basis of the reverse-direction control signal is inverted from the image formed when the scanning line drive circuit is driven on the basis of the forward-direction control signal. Such an image inverting display function is necessary for applying the electro-optical device, in particular, to a projector.

The reverse-direction control signal generating circuit supplies the forward-direction control signal and the reverse-direction control signal to the scanning line drive circuit. This enables the scanning line drive circuit to supply the scanning signals to the scanning lines in the first order or the second order, which is the reverse of the first order, on the basis of the forward-direction control signal or the reverse-direction control signal, respectively. Thus, the user can select whether to invert an image to be displayed.

Additionally, the reverse-direction control signal is generated by the substrate-built-in reverse-direction control signal generating circuit, which is disposed on the substrate. This eliminates the necessity of providing an external-circuit connecting terminal for supplying the reverse-direction control signal from an external circuit or providing dedicated wiring extended from such an external-circuit connecting terminal. Accordingly, the space on the substrate can be effectively utilized, for example, the external-circuit connecting terminal can be used for supplying control signals other than the reverse-direction control signal. It is also possible to reduce differences in the phase, amplitude, waveform, etc., between the forward-direction control signal and the reverse-direction control signal, which would be caused by different levels of noise from wiring or circuits influencing on the forward-direction control signal and the reverse-direction control signal.

As described above, in the electro-optical device, the forward-direction control signal and the reveres-direction control signal can be reliably supplied to the scanning line drive circuit. Thus, the user can select whether to invert an image to be displayed.

It is preferable that two scanning line drive circuits and two reverse-direction control signal generating circuits may be provided. In this case, the two scanning line drive circuits may be disposed in a peripheral region around the pixel area and along a pair of first sides of the substrate, and the two reverse-direction control signal generating circuits may be disposed in the peripheral region in association with the corresponding two scanning line drive circuits.

By providing two reverse-direction control signal generating circuits, it is possible to stably supply the forward-direction control signal and the reverse-direction control signal compared with when only one reverse-direction control signal generating circuit is provided. By setting the distance between the reverse-direction control signal generating circuit and the scanning line drive circuit to be small to such a degree that the entry of noise from other circuits or wiring into the forward-direction control signal and the reverse-direction control signal can be prevented or that the forward-direction control signal and the reverse-direction control signal are not attenuated by, for example, wiring resistance, the forward-direction control signal and the reverse-direction control signal can be supplied more stably. Thus, erroneous operations in the scanning line drive circuits can be prevented, and as a result, high-quality images can be displayed.

It is preferable that two scanning line drive circuits may be provided. In this case, the two scanning line drive circuits may be disposed in a peripheral region around the pixel area and along a pair of first sides of the substrate, and the reverse-direction control signal generating circuit may be disposed in the peripheral region between the pair of first sides of the substrate.

With this arrangement, the reverse-direction control signal generating circuit is disposed toward the central portion of one of second sides, which are adjacent to the first sides. Accordingly, the reverse-direction control signal generating circuit can supply almost the same, or more preferably, exactly the same forward-direction control signals or reverse-direction control signals to the scanning line drive circuits disposed in the peripheral region around the image display area and along the first sides of the substrate. Accordingly, it is possible to reduce, or more preferably, eliminate operational differences between the two scanning line drive circuits.

It is preferable that the electro-optical device may further include an external-circuit connecting terminal, disposed on the substrate, for supplying the forward-direction control signal. In this case, the reverse-direction control signal generating circuit is disposed closer to the scanning line drive circuit than the external-circuit connecting terminal in a wiring path from the external-circuit connecting terminal to the scanning line drive circuit.

With this arrangement, as viewed from the reverse-direction control signal generating circuit, the external-circuit connecting terminal is located farther away than the scanning line drive circuit. Accordingly, the wiring resistance or wiring capacitance of the wiring from the external-circuit connecting terminal to the reverse-direction control signal generating circuit is greater than that when the reverse-direction control signal generating circuit is located closer to the external-circuit connecting terminal than the scanning line drive circuit. Thus, even if static electricity is accidentally applied to the external-circuit connecting terminal during or after the manufacturing of the liquid crystal device, the occurrence of electrostatic damage in the reverse-direction control signal generating circuit can be reduced or prevented.

It is preferable that the reverse-direction control signal generating circuit may be disposed in a peripheral region around the pixel area and at a position opposite a position where the external-circuit connecting terminal is disposed with respect to the image area.

With this arrangement, the reverse-direction control signal generating circuit is disposed in an area where the number of external-circuit connecting terminals for supplying image signals or various control signals or the number of wiring patterns is less than the area where the external-circuit connecting terminals are disposed. In other words, the reverse-direction control signal generating circuit is disposed in a free space. Accordingly, the provision of the reverse-direction control signal generating circuit does not increase the area of the substrate or change the design of other circuits or wiring.

It is preferable that the electro-optical device may further include a counter substrate disposed opposite the substrate and a sealing material for fixing the substrate to the counter substrate. In this case, when viewed from the top of the substrate, the reverse-direction control signal generating circuit is disposed in a portion formed between the pixel area and a sealing area in which the sealing material is formed.

With this arrangement, the substrate and the counter substrate are fixed to each other with the sealing material, which is composed of, for example, a photocurable resin, disposed in the sealing area. The sealing area is positioned around the pixel area, and is formed generally in a rectangular shape and is positioned beyond the outer periphery of a frame-like area defining the periphery of the pixel area.

The reverse-direction control signal generating circuit is disposed in the portion between the pixel area and the sealing area. Thus, after fixing the substrate and the counter substrate to each other, it is possible to reduce an electrical or physical influence from an external source on the reverse-direction control signal generating circuit. That is, the reverse-direction control signal generating circuit can be protected.

It is preferable that the electro-optical device may further include a frame-like light-shielding film that defines the periphery of the image area. In this case, the reverse-direction control signal generating circuit may be disposed in a frame-like area in which the frame-like light-shielding film is formed.

If the pixel area is formed in a rectangular shape, the frame-like area rims around the rectangular pixel area with a predetermined length therebetween. The reverse-direction control signal generating circuit can be disposed in the frame-like area without adversely influencing the image display in a practical sense or without increasing the size of the substrate. The frame-like area may be considered as an area positioned between the pixel area and the peripheral region or may be part of the peripheral region that contacts the pixel area. Whichever it is, the periphery of the pixel area is defined by the frame-like light-shielding film.

It is preferable that the scanning line drive circuit may include a shift register that sequentially outputs transfer signals for controlling the timing of supplying the scanning signals and that can reverse the driving order of the scanning signals on the basis of the forward-direction control signal and the reverse-direction control signal.

With this configuration, the driving direction of the shift register in the scanning line drive circuit is shifted between the forward direction and the reverse direction on the basis of the forward-direction control signal and the reverse-direction control signal, respectively, thereby making it possible to reverse the direction in which the scanning signals are supplied. That is, the shift register is a bidirectional shift register. Thus, the scanning direction can be controlled relatively easily by controlling the driving direction of the shift register built in the scanning line drive circuit.

According to another aspect of the invention, there is provided an electronic apparatus including the aforementioned electro-optical device.

Accordingly, various high-quality display electronic apparatuses can be implemented, such as projection display devices, cellular telephones, electronic diaries, word-processors, view-finder-type or monitor-direct-view-type video recorders, workstations, videophones, point-of-sale (POS) terminals, touch panels, and electrophoretic devices, for example, electronic paper.

Further operations and advantages of the invention will become apparent from the following description of exemplary embodiments with reference to the attached drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention is described in detail below with reference to the accompanying drawings through preferred embodiments. In the following embodiments, electro-optical devices are discussed below in the context of thin film transistor (TFT) active matrix drive liquid crystal devices having built-in drive circuits.

First Embodiment

A liquid crystal device according to a first embodiment of the invention is described below with reference to FIGS. 1 through 5.

Figure 1:
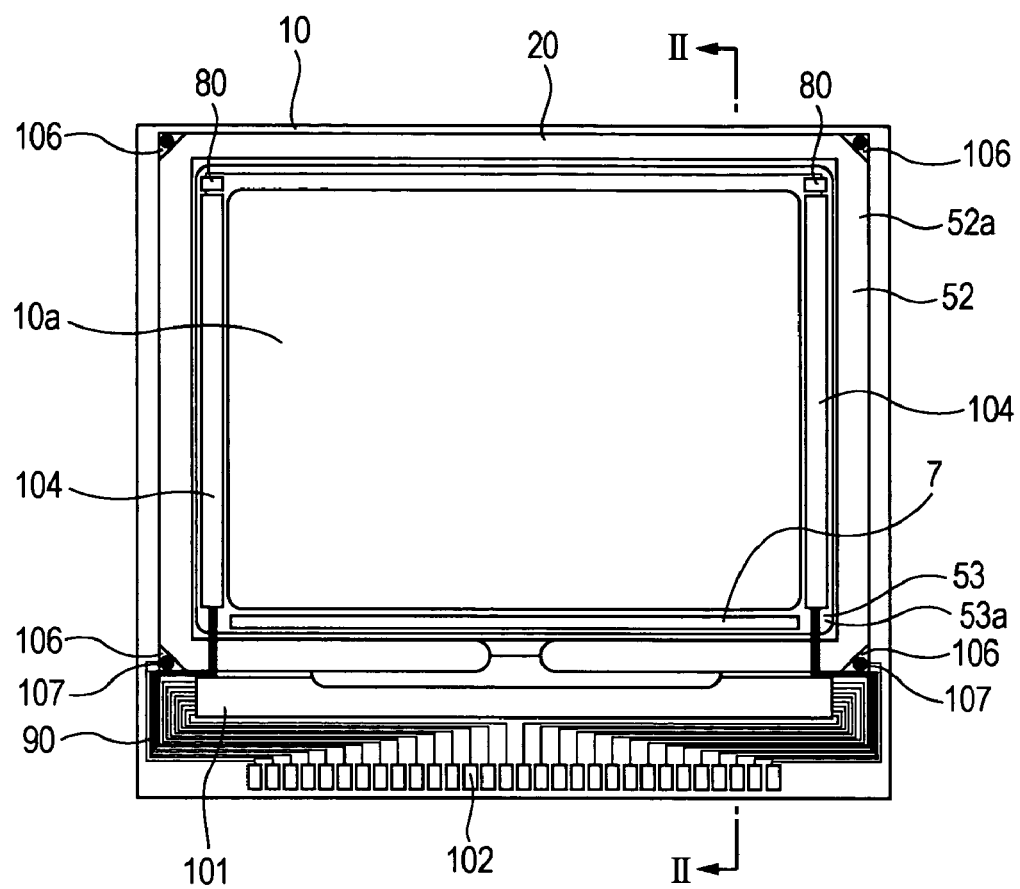
FIG. 1 is a plan view illustrating the overall configuration of a liquid crystal device according to a first embodiment of the invention.

The overall configuration of the liquid crystal device of the first embodiment is discussed below with reference to FIGS. 1 and 2. FIG. 1 is a plan view illustrating the configuration of the liquid crystal device of the first embodiment, and FIG. 2 is a sectional view taken along line II-II of FIG. 1.

Figure 2:
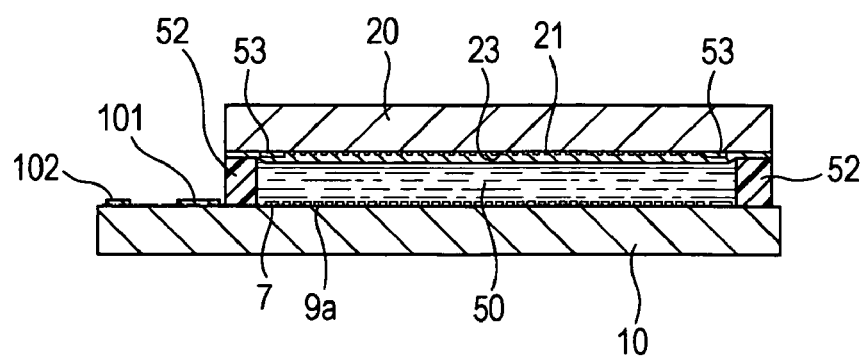
FIG. 2 is a sectional view taken along line II-II of FIG. 1.

In the liquid crystal device of the first embodiment shown in FIGS. 1 and 2, a TFT array substrate 10 and a counter substrate 20 are disposed facing each other. A liquid crystal layer 50 is sealed between the TFT array substrate 10 and the counter substrate 20. The TFT array substrate 10 and the counter substrate 20 are fixed to each other with a sealing material 52, which is composed of, for example, a photocurable resin, disposed in a sealing area 52a, which is positioned around an image display area 10a. When viewed from the top in FIG. 1, the sealing area 52a is formed generally in a rectangular shape and is positioned such that it surrounds the image display area 10a on the TFT array substrate 10.

In FIG. 1, a frame-like light-shielding film 53 that defines the periphery of the image display area 10a is provided in a frame-like area 53a on the surface of the counter substrate 20 such that it is positioned in parallel with and farther inward than the sealing area 52a. The frame-like area 53a is formed generally in a rectangular shape on the TFT array substrate 10 when viewed from the top.

In the peripheral region of the TFT array substrate 10, and more specifically, in a region around the sealing area 52a, a data line drive circuit 101 and external-circuit connecting terminals 102 are disposed on one side of the TFT array substrate 10. A sampling circuit 7 is disposed in the frame-like area 53a, which is positioned farther inward than the sealing area 52a, on the side of the TFT array substrate 10 on which the data line drive circuit 101 and the external-circuit connecting terminals 102 are disposed. The sampling circuit 7 is covered with the frame-like light-shielding film 53. Additionally, to connect the two scanning line drive circuits 104, each being disposed on either side of the image display area 10a, a plurality of wiring patterns 105 (see FIG. 3) are disposed on a side opposite the above-described side of the TFT array substrate 10 such that they are covered with the frame-like light-shielding film 53, though they are not shown. The scanning line drive circuits 104 are disposed in the frame-like area 53a positioned farther inward than the sealing area 52a along the two sides adjacent to the side of the TFT array substrate 10 on which the wiring patterns 105 are disposed, the scanning line drive circuits 104 being covered with the frame-like light-shielding film 53. A reverse-direction control signal generating circuit 80, which is described below, is also disposed in the frame-like area 53a on either side of the TFT array substrate 10 in association with the corresponding scanning line drive circuit 104. Upper and lower conducting terminals 106 for connecting the TFT array substrate 10 and the counter substrate 20 with the use of upper and lower conducting materials 107 are disposed on the TFT array substrate 10 at positions corresponding to the four corners of the counter substrate 20. According to the provision of the upper and lower conducting terminals 106, the TFT array substrate 10 and the counter substrate 20 can be electrically connected to each other.

A routing wiring pattern 90 is formed on the TFT array substrate 10 for electrically connecting the external-circuit connecting terminals 102 with the data line drive circuit 101, the scanning line drive circuits 104, and the upper and lower conducting terminals 106.

In FIG. 2, on the TFT array substrate 10, a laminated structure incorporating pixel switching TFTs, which are drive elements, and wiring, such as scanning lines and data lines, is formed. In the image display area 10a, pixel electrodes 9a are disposed on a layer higher than the pixel switching TFTs and wiring, such as the scanning lines and data lines. A light-shielding film 23 is formed on the surface of the counter substrate 20 and faces the TFT array substrate 10. Counter electrodes 21, which are formed of a transparent material, such as indium tin oxide (ITO), are formed on the light-shielding film 23 while facing the pixel electrodes 9a. The liquid crystal layer 50 includes, for example, one type of nematic liquid crystal or a mixture of a plurality of types of nematic liquid crystal, and forms a predetermined alignment condition between a pair of alignment films.

On the TFT array substrate 10, not only the data line drive circuit 101 and the scanning line drive circuits 104, but also an inspection circuit or an inspection pattern for checking the quality or checking for defects of liquid crystal devices while being manufactured or those when being shipped, may be formed.

Figure 3:
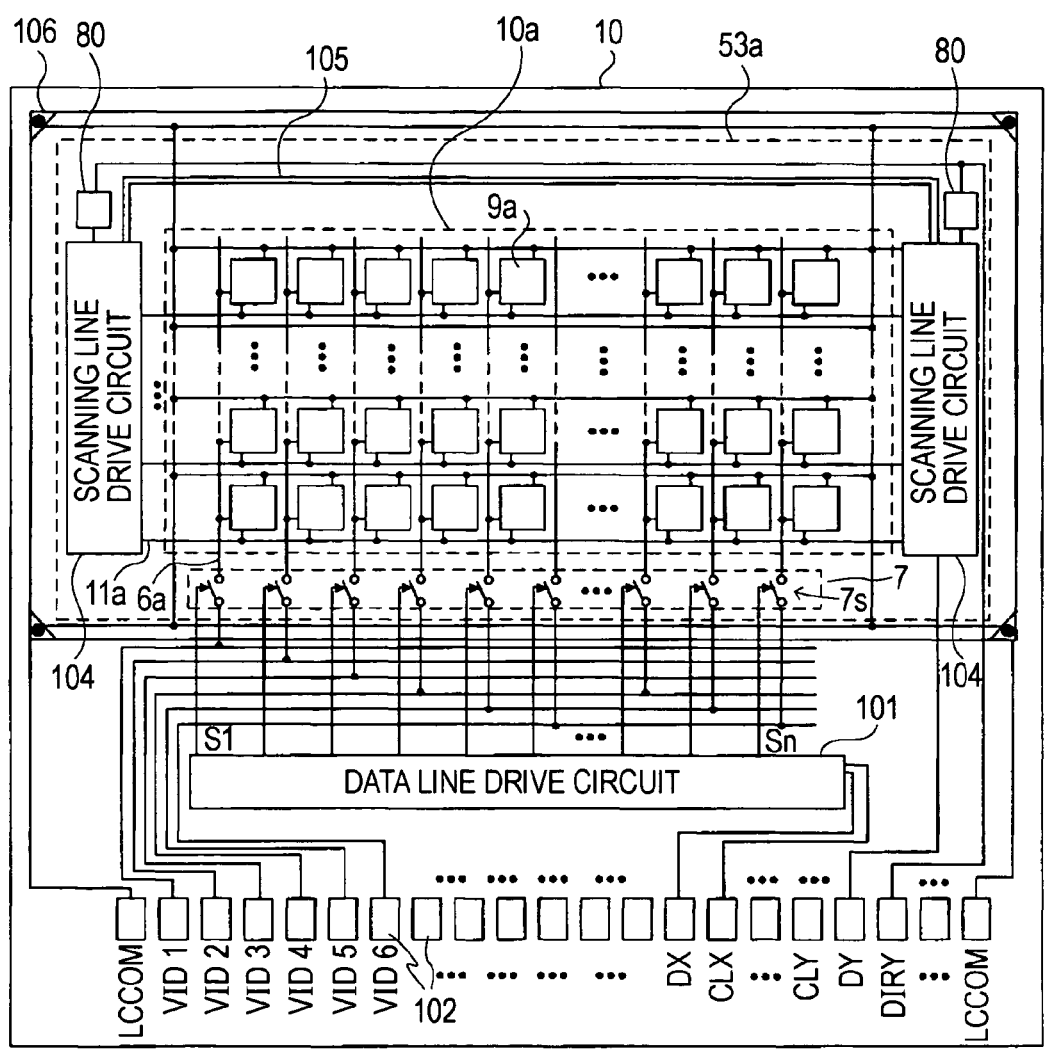
FIG. 3 is a block diagram illustrating the configuration of the essential portions of the liquid crystal device according to the first embodiment.
Figure 4:
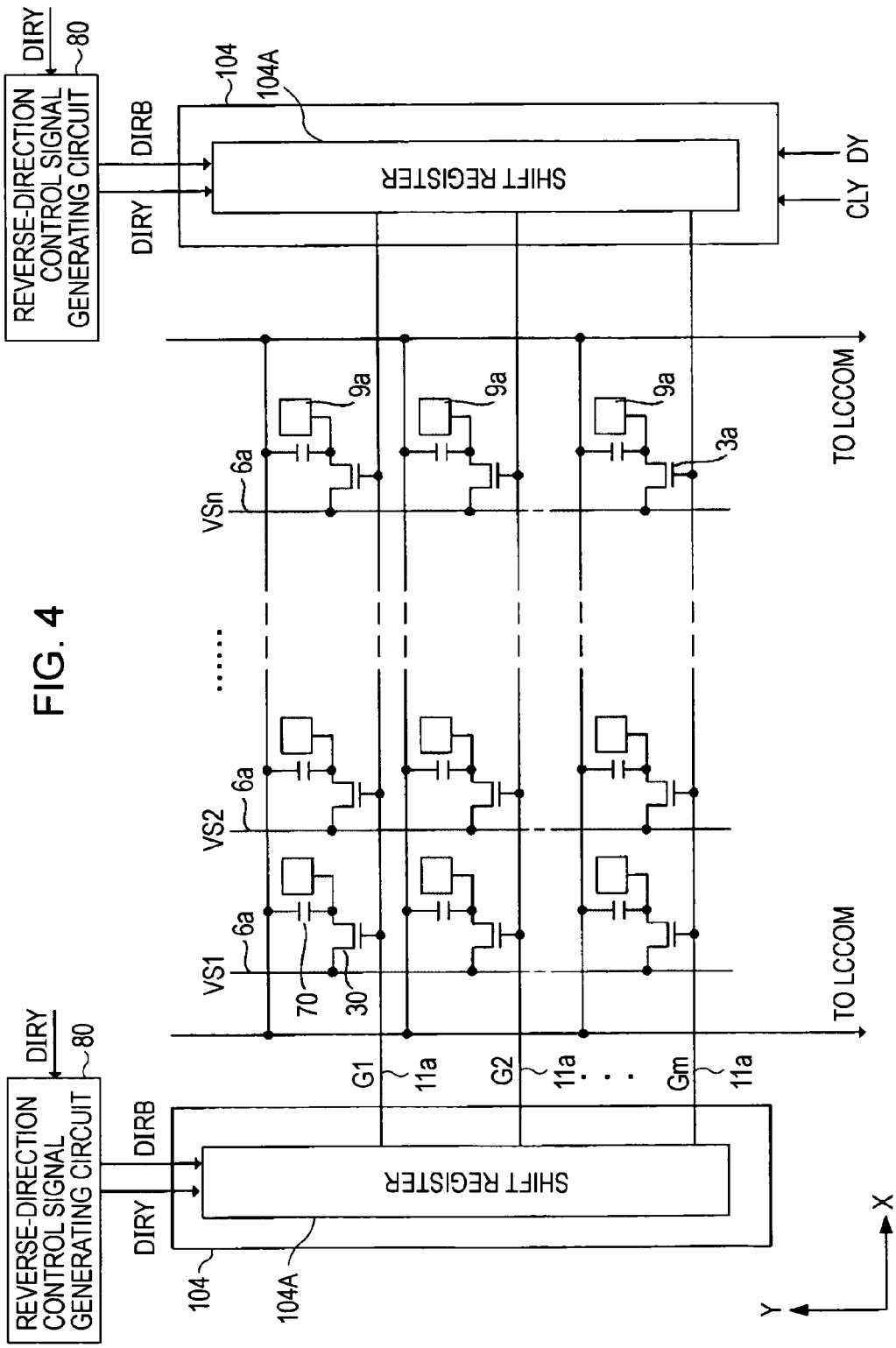
FIG. 4 is a block diagram illustrating the electrical configuration of the pixel portions of the liquid crystal device according to the first embodiment.

The configuration of the essential portions of the liquid crystal device shown in FIGS. 1 and 2 is now described with reference to FIGS. 3 and 4. FIG. 3 is a block diagram illustrating the configuration of the essential portions of the liquid crystal device of the first embodiment, and FIG. 4 is a block diagram illustrating the electrical configuration of the pixel portions of the liquid crystal device.

In the liquid crystal device shown in FIG. 3, drive circuits, such as the scanning line drive circuits 104, the data line drive circuit 101, and the sampling circuit 7, are formed in the peripheral region around the image display area 10a of the TFT array substrate 10.

As shown in FIG. 3, a Y clock signal CLY (and an inverted Y clock signal CLYB) and a Y start pulse signal DY are supplied to the scanning line drive circuits 104 from an external circuit via the external-circuit connecting terminals 102. As shown in FIG. 4, forward-direction control signals DIRY and reverse-direction control signals DIRYB are supplied to the scanning line drive circuits 104 from the reverse-direction control signal generating circuits 80, which are described below. The scanning line drive circuits 104 sequentially generate scanning signals G1, . . . , and Gm in that order or in the reverse order on the basis of the forward-direction control signal DIRY or the reverse-direction control signal DIRYB, respectively, and output the generated scanning signals. The generation of the scanning signals by the scanning line drive circuits 104 is discussed in detail below.

As shown in FIG. 3, an X clock signal CLX (and an inverted X clock signal CLXB) and an X start pulse DX are supplied to the data line drive circuit 101 from an external circuit via the external-circuit connecting terminals 102. Upon receiving the X start pulse DX, the data line drive circuit 101 sequentially generates sampling signals S1, . . . , and Sn in synchronization with the X clock signal CLX (and the inverted X clock signal CLXB), and outputs the generated sampling signals.

The sampling circuit 7 includes a plurality of sampling switches 7s formed of P-channel or N-channel TFTs or complementary TFTs.

In the liquid crystal device of the first embodiment, as shown in FIG. 3, a plurality of pixel portions, each including a pixel electrode 9a, the pixel electrodes 9a being formed in a matrix, are provided in the image display area 10a, which occupies the central area of the TFT array substrate 10.

Each pixel portion includes, as shown in FIG. 4, the pixel electrode 9a and a TFT 30 for controlling the switching of the corresponding pixel electrode 9a. Data lines 6a to which image signals VS1, VS2, . . . , and VSn are supplied are electrically connected to the sources of the corresponding TFTs 30. The image signals VS1, VS2, . . . , and VSn may be line-sequentially supplied in that order to the corresponding data lines 6a one by one, or an image signal may be supplied to a plurality of adjacent data lines 6a as a group. In this embodiment, as shown in FIG. 3, the temporally serial image signals VS1, VS2, . . . , and VSn are subjected to serial-to-parallel conversion, resulting in 6 temporally parallel image signals VID1 through VID6. Then, the temporally parallel signals VID1 through VID6 are simultaneously supplied to a group of six data lines 6a provided in association with the image signals VID1 through VID6. The number of image signals to be expanded in parallel is not restricted to 6. Alternatively, a temporally serial image signal may be expanded into 9, 12, or 24 temporally parallel image signals, and the expanded image signals may be simultaneously supplied to the corresponding number of data lines 6a as a group.

In FIG. 4, gate electrodes 3a are electrically connected to the gates of the corresponding TFTs 30. The scanning signals G1, G2, . . . , and Gm are line-sequentially applied in a pulsating manner at a predetermined timing to scanning lines 11a and the gate electrodes 3a from the scanning line drive circuits 104 in the order of G1, G2, . . . , and Gm or in the reverse order, which is discussed in detail below. The pixel electrodes 9a are electrically connected to the drains of the corresponding TFTs 30, and switch ON the TFTs 30, which are switching elements, during a predetermined period so that the corresponding image signals VS1, VS2, . . . , and VSn supplied from the data lines 6a are written into the pixel portions at a predetermined timing.

The image signals VS1, VS2, . . . , and VSn having a predetermined level written into the liquid crystal via the pixel electrodes 9a are held between the pixel electrodes 9a and the counter electrodes 21 formed on the counter substrate 20 for a predetermined period. When a voltage is applied to liquid crystal, the orientation and order of the molecular assembly of the liquid crystal are changed in accordance with the level of the applied voltage, and then, the liquid crystal modulates light and implements the grayscale display. In the normally white mode, the transmission factor of the liquid crystal in response to incident light is decreased as the voltage applied to each pixel increases. In the normally black mode, the transmission factor of the liquid crystal in response to incident light is increased as the voltage applied to each pixel increases. When considering the transmission factors of all the pixels of the image display area, light having a contrast level in accordance with the image signals is emitted from the electro-optical device.

To prevent leakage of the image signals held in the liquid crystal, storage capacitors 70 are added in parallel with liquid crystal capacitors formed between the pixel electrodes 9a and the counter electrodes 21.

Figure 5:
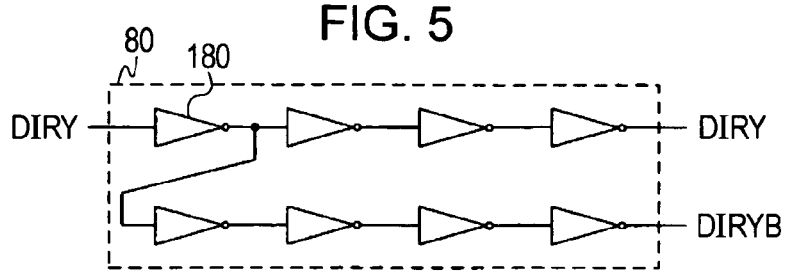
FIG. 5 is a circuit diagram illustrating a reverse-direction control signal generating circuit used in the liquid crystal device according to the first embodiment.

A detailed description is now given of the reverse-direction control signal generating circuit 80 with reference to FIGS. 1 and 3 through 5. FIG. 5 is a circuit diagram illustrating the electrical configuration of the reverse-direction control signal generating circuit 80.

In the liquid crystal device of this embodiment, as shown in FIGS. 3 and 4, the reverse-direction control signal generating circuits 80 are formed on the TFT array substrate 10. The reverse-direction control signal generating circuits 80 receive the forward-direction control signals DIRY for controlling the scanning line drive circuits 104 to supply the scanning signals G1, . . . , and Gm to the scanning lines 11a in that order (i.e., the order from the top to the bottom in the image display area 10a in FIG. 3), which is referred to as the "first order". Based on the forward-direction control signals DIRY, the reverse-direction control signal generating circuits 80 generate the reverse-direction control signals DIRYB for controlling the scanning line drive circuits 104 to supply the scanning signals in a second order, which is the reverse of the first order, (i.e., the order from the bottom to the top in the image display area 10a in FIG. 3). The image formed by the driving of the scanning line drive circuits 104 on the basis of the reverse-direction control signal DIRYB is inverted from the image formed by the driving of the scanning line drive circuits 104 on the basis of the forward-direction control signal DIRY. Such an image inverting function is necessary for applying a liquid crystal device, in particular, to a projector.

In the liquid crystal device of this embodiment, as shown in FIG. 4, the reverse-direction control signal generating circuits 80 supply the forward-direction control signals DIRY and the reverse-direction control signals DIRYB to the scanning line drive circuits 104. This enables the scanning line drive circuits 104 to supply the scanning signals G1, . . . , and Gm in the first order or the second order, which is the reverse of the first order, to the scanning lines 11a on the basis of the forward-direction control signal DIRY or the reverse-direction control signal DIRYB, respectively. Accordingly, the user can select whether to invert an image to be displayed in the image display area 10a.

In the liquid crystal device of this embodiment, as shown in FIG. 3, the reverse-direction control signal DIRYB is generated by the substrate-built-in reverse-direction control signal generating circuits 80, which are disposed on the TFT array substrate 10. This eliminates the necessity of providing the external-circuit connecting terminal 102 for supplying the reverse-direction control signal DIRYB from an external circuit. Accordingly, the space on the TFT array substrate 10 can be effectively utilized, for example, the external-circuit connecting terminal 102 can be used for supplying control signals other than the reverse-direction control signal DIRYB.

The specific configuration of the reverse-direction control signal generating circuits 80 is described below with reference to FIG. 5. The reverse-direction control signal generating circuit 80 includes, as shown in FIG. 5, a plurality of inverters 180. When the forward-direction control signal DIRY is input into the reverse-direction control signal generating circuit 80, the forward-direction control signal DIRY is output via the four inverters, which serve as buffer circuits, and also, the reverse-direction control signal DIRYB, which is generated by inverting the potential of the forward-direction control signal DIRY with respect to the reference potential, is output via one inverter, which serves as an inverting circuit, and three inverters, which serve as buffer circuits. The reverse-direction control signal generating circuit 80 is not restricted to the configuration shown in FIG. 5. For example, the number of inverters may be changed. According to the reverse-direction control signal generating circuit 80 configured as described above, the forward-direction control signal DIRY and the reverse-direction control signal DIRYB can be output from the reverse-direction control signal generating circuit 80 almost without any difference in the phase, amplitude, waveform, etc., between the two signals. In other words, even if there are differences in the phase, amplitude, waveform, etc., between the forward-direction control signal DIRY input into the reverse-direction control signal generating circuit 80 and the reverse-direction control signal DIRYB output from the reverse-direction control signal generating circuit 80, such differences can be safely ignored.

As shown in FIG. 3, the reverse-direction control signal generating circuit 80 is provided on either side (first side) of the frame-like area 53a (see FIG. 1) in association with the corresponding scanning line drive circuit 104. In other words, when viewed from the top on the TFT array substrate 10, the reverse-direction control signal generating circuit 80 is provided above the corresponding scanning line drive circuit 104. Accordingly, the forward-direction control signal DIRY and the reverse-direction control signal DIRYB can be stably supplied compared with when only one reverse-direction control signal generating circuit 80 is provided. Additionally, as shown in FIG. 3, the distance between the reverse-direction control signal generating circuit 80 and the scanning line drive circuit 104 is small to such a degree that the entry of noise from other circuits or wiring into the forward-direction control signal DIRY and the reverse-direction control signal DIRYB can be prevented or that the forward-direction control signal DIRY and the reverse-direction control signal DIRYB are not attenuated by, for example, wiring resistance. Accordingly, the reverse-direction control signal generating circuit 80 can supply the forward-direction control signal DIRY and the reverse-direction control signal DIRYB more stably to the scanning line drive circuit 104, thereby eliminating the occurrence of erroneous operations in the scanning line drive circuit 104. If the forward-direction control signal DIRY and the reverse-direction control signal DIRYB are subjected to different levels of noise, there may also be differences in the phase, amplitude, waveform, etc., between the forward-direction control signal DIRY and the reverse-direction control signal DIRYB. In this embodiment, it is possible to reduce such differences in the phase, amplitude, waveform, etc., because of the provision of the reverse-direction control signal generating circuits 80. That is, the display characteristics obtained when the forward-direction control signal DIRY is used can be substantially the same as those obtained when the reverse-direction control signal DIRYB is used, except that the resulting images are inverted from each other.

In the liquid crystal device of this embodiment, as shown in FIG. 3, in the wiring path from the external-circuit connecting terminals 102 to the scanning line drive circuits 104, the reverse-direction control signal generating circuits 80 are located closer to the scanning line drive circuits 104 than the external-circuit connecting terminals 102. That is, as viewed from the reverse-direction control signal generating circuits 80, the external-circuit connecting terminals 102 are located farther away than the scanning line drive circuits 104. Accordingly, the wiring resistance or wiring capacitance of the wiring from the external-circuit connecting terminals 102 to the reverse-direction control signal generating circuits 80 is larger than that when the reverse-direction control signal generating circuits 80 are located closer to the external-circuit connecting terminals 102 than the scanning line drive circuits 104. Thus, even if static electricity is accidentally applied to the external-circuit connecting terminals 102 during or after the manufacturing of the liquid crystal device, the occurrence of electrostatic damage in the reverse-direction control signal generating circuits 80 can be reduced or prevented.

Additionally, in FIG. 3, in the peripheral region of the image display area 10*a*, the reverse-direction control signal generating circuits 80 are disposed opposite the external-circuit connecting terminals 102 with respect to the image display area 10*a*. That is, the reverse-direction control signal generating circuits 80 are disposed in an area where the amount of wiring, such as the routing wiring 90, is less than the area where the external-circuit connecting terminals 102 are disposed. In other words, the reverse-direction control signal generating circuits 80 are disposed in a free space. Accordingly, the provision of the reverse-direction control signal generating circuits 80 does not increase the area of the TFT array substrate 10 or change the design of other circuits or wiring.

As shown in FIG. 1, since the reverse-direction control signal generating circuits 80 are disposed in the frame-like area 53*a*, as stated above, they do not produce an adverse influence on the image display in a practical sense, nor is it necessary to increase the size of the TFT array substrate 10. Additionally, the reverse-direction control signal generating circuits 80 are disposed in the portion between the image display area 10*a* and the sealing area 52*a*. Thus, after fixing the TFT array substrate 10 and the counter substrate 20 to each other, it is possible to reduce an electrical or physical influence from an external source on the reverse-direction control signal generating circuits 80. That is, the reverse-direction control signal generating circuits 80 can be protected.

The configuration of the scanning line drive circuits 104 are described below with reference to FIG. 4.

In FIG. 4, the scanning line drive circuits 104 include bidirectional shift registers 104A that sequentially output transfer signals for controlling the timing of supplying the scanning signals G1, . . . , and Gm and that can reverse the driving order of the scanning signals on the basis of the forward-direction control signal DIRY and the reverse-direction control signal DIRYB. Accordingly, it is possible to reverse the direction in which the scanning signals are supplied by driving the shift registers 104A in the forward direction or the reverse direction on the basis of the forward-direction control signal DIRY or the reverse-direction control signal DIRYB, respectively. Thus, the scanning direction can be controlled relatively easily by controlling the driving direction of the shift registers 104A built in the scanning line drive circuits 104.

As described above, according to the liquid crystal device of the first embodiment, the forward-direction control signal DIRY and the reverse-direction control signal DIRYB can be reliably supplied to the scanning line drive circuits 104, thereby enabling the user to select whether to invert an image.

Second Embodiment

Figure 6:
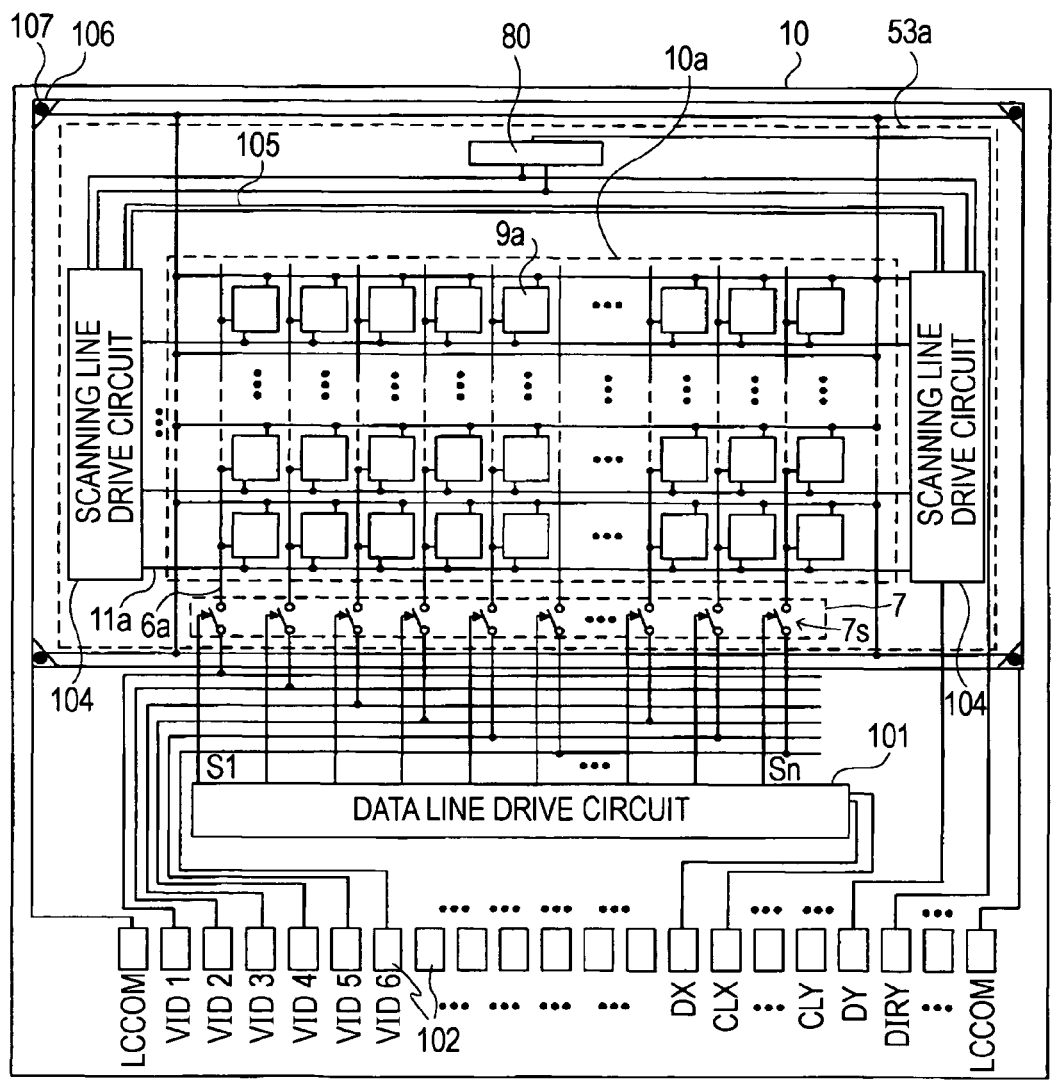
FIG. 6 is a block diagram illustrating the configuration of the essential portions of the liquid crystal device according to a second embodiment of the invention.

An electro-optical device according to a second embodiment of the invention is described below with reference to FIG. 6, which is similar to FIG. 3. In FIG. 6, elements similar to those of the first embodiment shown in FIG. 3 are designated with like reference numerals, and an explanation thereof is thus omitted.

In FIG. 6, it is now assumed that the left and right sides of the image display area 10*a* are referred to as "first sides", while the upper and lower sides of the image display area 10*a* are referred to as "second sides". The reverse-direction control signal generating circuit 80 is located toward the central portion of the upper side of the second sides. Accordingly, the reverse-direction control signal generating circuit 80 can supply almost the same, more preferably, exactly the same forward-direction control signals DIRY or reverse-direction control signals DIRYB to the scanning line drive circuits 104 disposed around the image display area 10*a* on the first sides of the TFT array substrate 10, i.e., the scanning line drive circuits 104 disposed on the left and right sides of the image display area 10*a*. Accordingly, it is possible to reduce, or more preferably, eliminate operational differences between the two scanning line drive circuits 104, thereby preventing erroneous operations of the electro-optical device.

By forming the reverse-direction control signal generating circuit 80 in the frame-like area 53*a*, the area which is used only for routing wiring in existing electro-optical devices can be utilized efficiently, thereby greatly contributing to the miniaturization of the electro-optical device.

Electronic Apparatus

The application of the above-described liquid crystal device, which serves as the electro-optical device according to the first or second embodiment, to various electronic apparatuses is discussed below.

Figure 7:
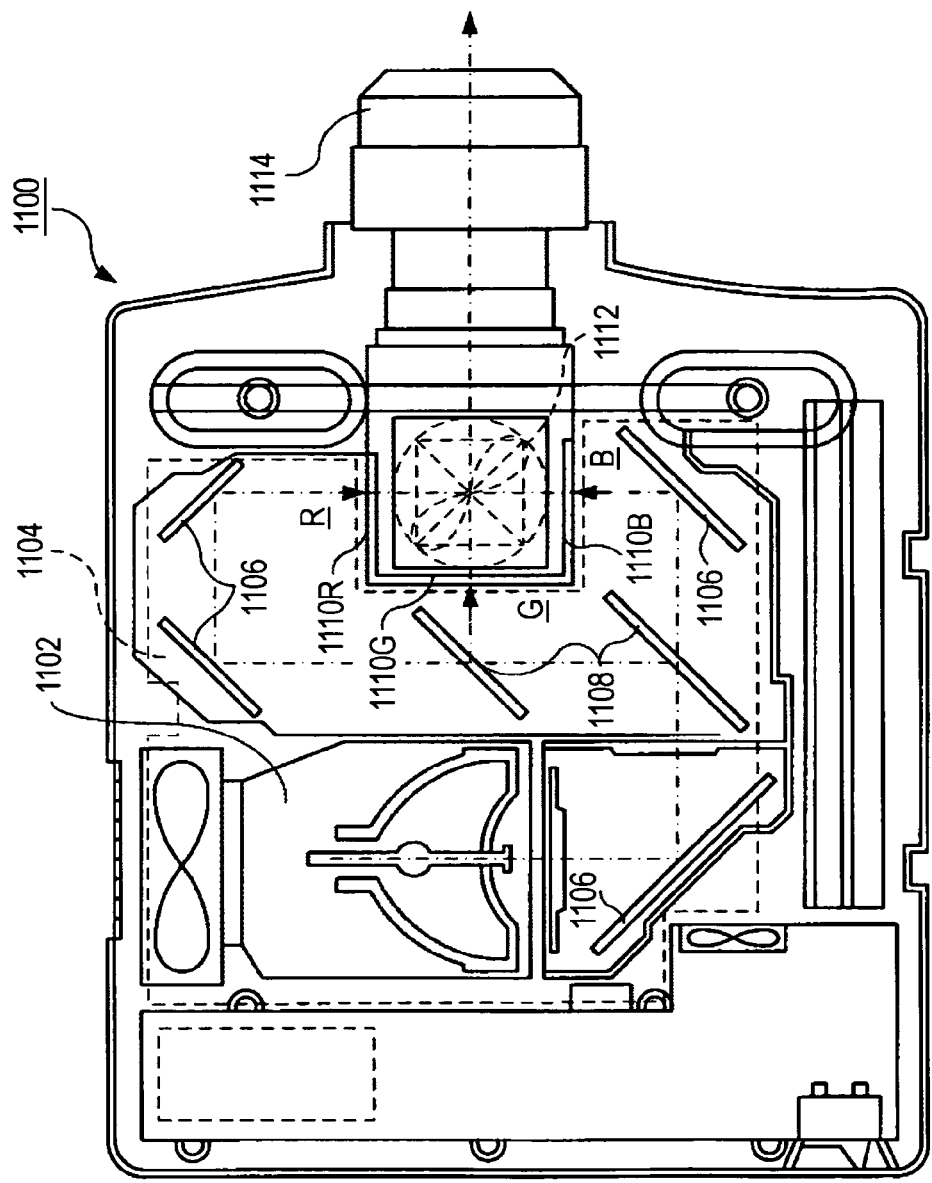
FIG. 7 is a plan view illustrating the configuration of a projector, which is an example of an electronic apparatus including the electro-optical device.

A projector using the liquid crystal devices as light valves is first described with reference to the plan view of FIG. 7. In a projector 1100, as shown in FIG. 7, a lamp unit 1102 including a white light source, such as a halogen lamp, is disposed. Projection light emitted from the lamp unit 1102 is separated into three primary colors, i.e., R, G, and B colors, by four mirrors 1106 and two dichroic mirrors 1108, which are disposed in a light guide 1104, and the R, G, and B color light components are incident on liquid crystal panels 1110R, 1110G, and 1110B which serve as light valves corresponding to the R, G, and B colors, respectively.

The configuration of the liquid crystal panels 1110R, 1110G, and 1110B is basically equivalent to the above-described liquid crystal device, and the liquid crystal panels 1110R, 1110G, and 1110B are driven by R, G, and B color signals supplied from an image signal processing circuit. The R, G, and B color light components modulated by the liquid crystal panels 1110R, 1110B, and 1110G are incident on a dichroic prism 1112 in the three directions. In the dichroic prism 1112, the R and B light components are refracted at 90 degrees, while the G light component passes direct through the dichroic prism 1112. As a result of combining the R, G, and B colors components, a color image can be projected on a screen through a projection lens 1114.

By focusing on display images formed by the liquid crystal panels 1110R, 1110G, and 1110B, it is necessary that the display image formed by the liquid crystal panel 1110G be horizontally inverted (mirror-reversed) with respect to the display images formed by the liquid crystal panels 1110R and 1110B.

By the provision of the dichroic mirrors 1108, light components corresponding to R, G, and B primary colors are incident on the liquid crystal panels 1110R, 1110G, and 1110B, thereby eliminating the necessity of providing a color filter.

Figure 8:
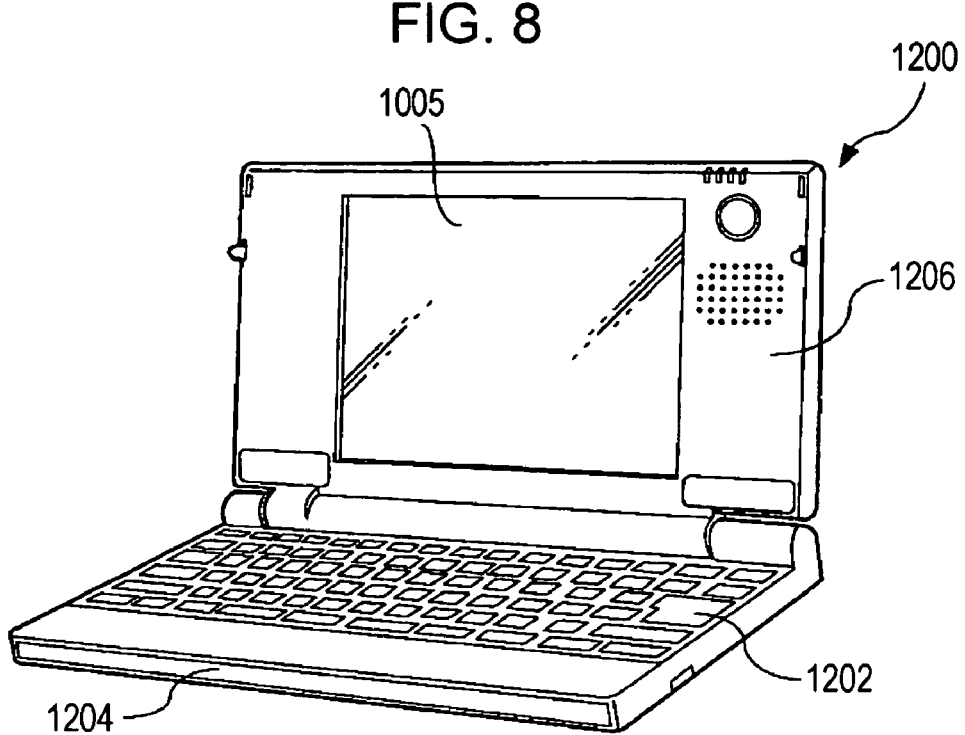
FIG. 8 is a perspective view illustrating the configuration of a personal computer, which is another example of an electronic apparatus including the electro-optical device.

A mobile personal computer including the above-described liquid crystal device is described below with reference to the perspective view of FIG. 8. In FIG. 8, a personal computer 1200 includes a main unit 1204 including a keyboard 1202 and a liquid crystal display unit 1206. The liquid crystal display unit 1206 is formed by adding backlight to the back side of a liquid crystal device 1005, which serves as the liquid crystal device of the first or second embodiment.

Figure 9:
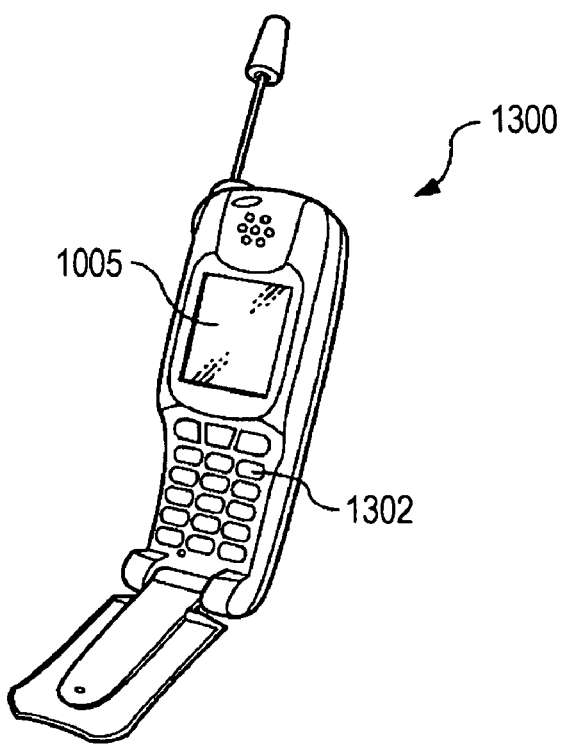
FIG. 9 is a perspective view illustrating the configuration of a cellular telephone, which is another example of an electronic apparatus including the electro-optical device.

A cellular telephone using the above-described liquid crystal device is discussed below with reference to the perspective view of FIG. 9. In FIG. 9, a cellular telephone 1300 includes a plurality of operation buttons 1302 and the liquid crystal device 1005, which is a reflective type. Front light may be disposed on the front side of the reflective liquid crystal device 1005 if necessary.

The electronic apparatuses may include, not only the projector, the personal computer, and the cellular telephone, shown in FIGS. 7, 8, and 9, respectively, but also liquid crystal televisions, view-finder-type or monitor-direct-view-type video recorders, car navigation systems, pagers, electronic diaries, calculators, word-processors, workstations, videophones, point-of-sale (POS) terminals, devices provided with touch panels. The liquid crystal device can be used for those electronic apparatuses.

The invention may be applied, not only to the above-described types of liquid crystal devices, but also to reflective-type liquid crystal devices in which elements are formed on a silicon substrate (liquid crystal on silicon (LCOS)) plasma display panels (PDPs), field emission displays (FEDs), surface-conduction electron-emitter displays (SEDs), organic electroluminescence (EL) displays, etc.

The invention is not restricted to the above-described embodiments, and various modifications may be made within the scope of the claims and without departing from the spirit of the invention. Electro-optical devices formed by such modifications and electronic apparatuses including such electro-optical devices are encompassed within the technical concept of the invention.

What is claimed is:

1. An electro-optical device comprising:
   a plurality of pixel portions disposed in a pixel area;
   a plurality of scanning lines and a plurality of data lines disposed in the pixel area;
   at least one scanning line drive circuit that supplies scanning signals to the plurality of scanning lines; and
   at least one reverse-direction control signal generating circuit that:
      receives a forward-direction control signal for controlling the scanning line drive circuit to drive the scanning lines in a first order by supplying the scanning signals to the plurality of scanning lines in the first order,
      generates, based on the forward-direction control signal, a reverse-direction control signal for controlling the scanning line drive circuit to drive the scanning lines in a second order, which is the reverse of the first order, by supplying the scanning signals to the plurality of scanning lines in the second order, and
      supplies the forward-direction control signal and the reverse-direction control signal to the scanning line drive circuit.

2. The electro-optical device according to claim 1, wherein two of the scanning line drive circuits and two of the reverse-direction control signal generating circuits are provided,
   the two scanning line drive circuits are disposed in a peripheral region around the pixel area and along a pair of first sides of the peripheral region, and
   the two reverse-direction control signal generating circuits are disposed in the peripheral region in association with the corresponding two scanning line drive circuits.

3. The electro-optical device according to claim 1, wherein two of the scanning line drive circuits are provided,
   the two scanning line drive circuits are disposed in a peripheral region around the pixel area and along a pair of first sides of the peripheral region, and
   the reverse-direction control signal generating circuit is disposed in the peripheral region along a side of the peripheral region that is different than the first sides of the peripheral region.

4. The electro-optical device according to claim 1, further comprising an external-circuit connecting terminal, for supplying the forward direction control signal, wherein the reverse-direction control signal generating circuit is disposed closer to the scanning line drive circuit than the external-circuit connecting terminal in a wiring path from the external-circuit connecting terminal to the scanning line drive circuit.

5. The electro-optical device according to claim 4, wherein the reverse-direction control signal generating circuit is disposed in a peripheral region around the pixel area and at a position opposite a position where the external-circuit connecting terminal is disposed with respect to the image area.

6. The electro-optical device according to claim 1, further comprising:
   a substrate comprising the plurality of pixel portions;
   a counter substrate disposed opposite the substrate; and
   a sealing material for fixing the substrate to the counter substrate,
   wherein, when viewed from the top of the substrate, the reverse- direction control signal generating circuit is disposed in a portion formed between the pixel area and a sealing area in which the sealing material is formed.

7. The electro-optical device according to claim 1, further comprising a frame-like light-shielding film that defines a periphery of the image area,
   wherein the reverse-direction control signal generating circuit is disposed in a frame-like area in which the frame-like light-shielding film is formed.

8. The electro-optical device according to claim 1, wherein the scanning line drive circuit includes a shift register that sequentially outputs transfer signals for controlling the timing of supplying the scanning signals and that can reverse a driving order of the scanning signals on the basis of the forward-direction control signal and the reverse-direction control signal.

9. An electronic apparatus comprising the electro-optical device set forth in any one of claims 1 to 8.

* * * * *